Figure 1:
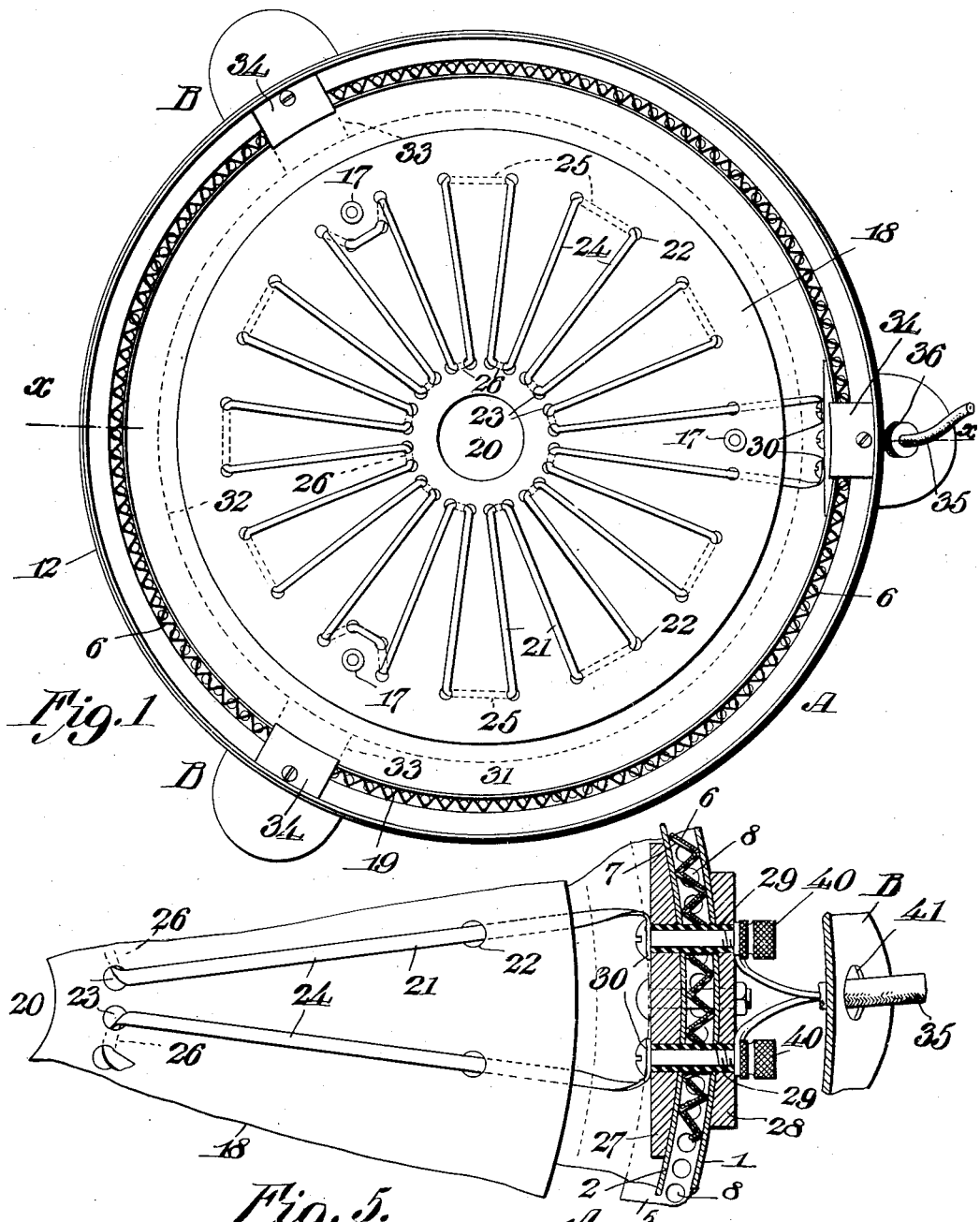

M. L. KEAGY.
ELECTRIC COOKER.
APPLICATION FILED APR. 11, 1913.
1,115,075.
Patented Oct. 27, 1914.
3 SHEETS—SHEET 2.
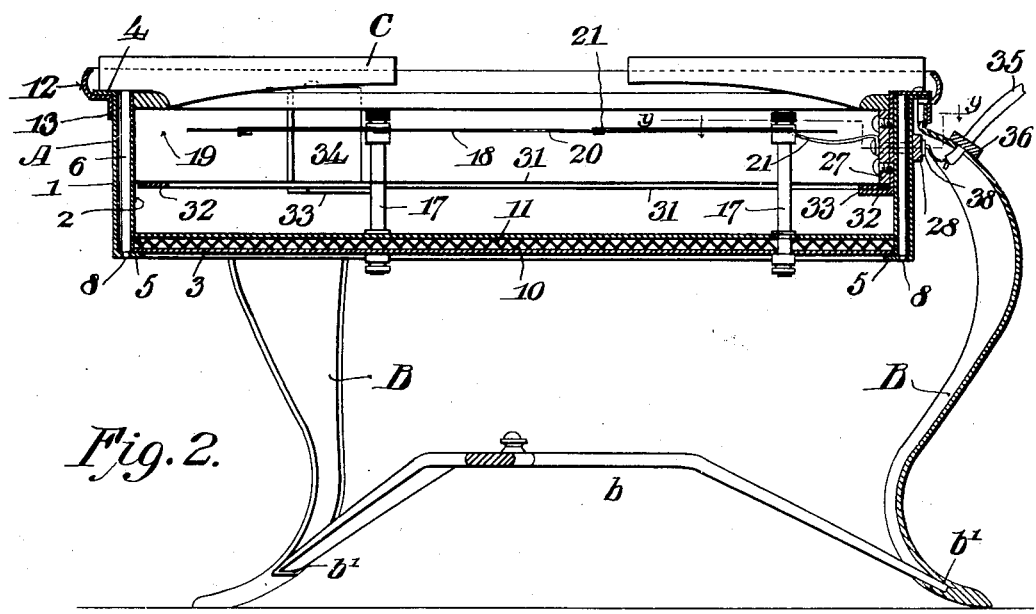
Fig. 2.
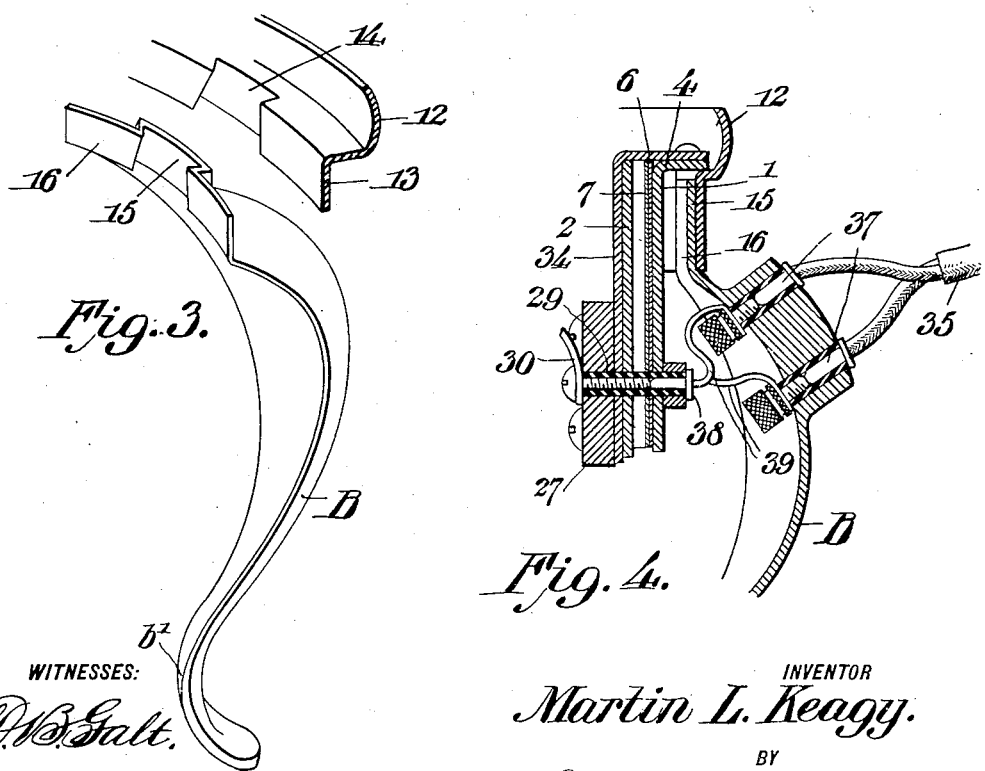
Fig. 3.
Fig. 4.
WITNESSES:
D. B. Galt.
H. S. Austin
INVENTOR
Martin L. Keagy.
BY
Joshua R. H. Potts
ATTORNEY M. L. KEAGY.
ELECTRIC COOKER.
APPLICATION FILED APR. 11, 1913.
1,115,075.
Patented Oct. 27, 1914.
3 SHEETS—SHEET 3.
Fig. 6.
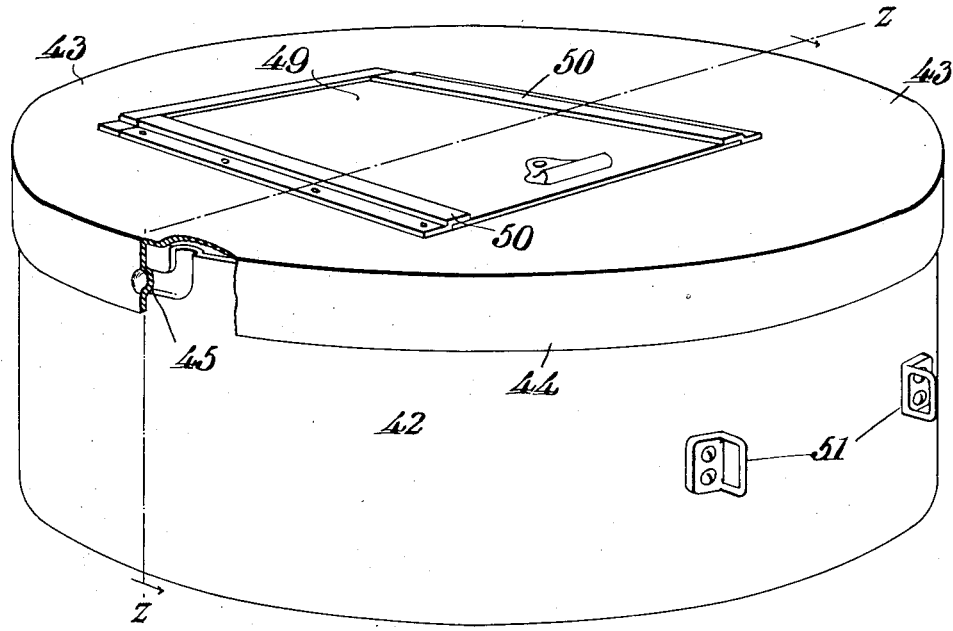
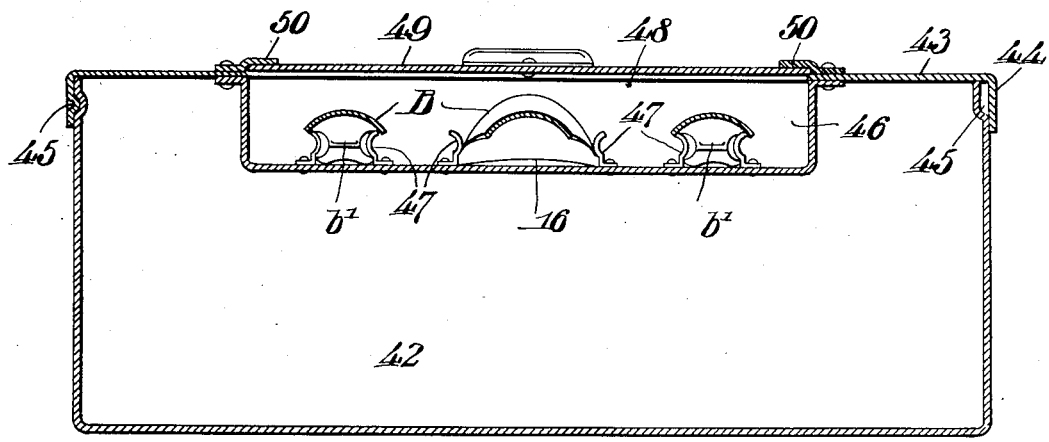
Fig. 7.
WITNESSES:
D. B. Galt
H. S. Austin
INVENTOR
Martin L. Keagy.
BY
Joshua R. H. Potts
ATTORNEY

UNITED STATES PATENT OFFICE.

MARTIN L. KEAGY, OF CANTON, OHIO.

ELECTRIC COOKER.

1,115,075.   Specification of Letters Patent.   Patented Oct. 27, 1914.

Application filed April 11, 1913. Serial No. 760,380.

*To all whom it may concern:*

Be it known that I, MARTIN L. KEAGY, a citizen of the United States, residing at Canton, county of Stark, and State of Ohio, have invented certain new and useful Improvements in Electric Cookers, of which the following is a specification.

My invention relates to electric cook stoves and particularly to small portable stoves of the class mentioned.

The object of my invention is to provide a small portable electric cooker that shall generate a great amount of heat and so constructed that the portions of the device with which the hands are liable to come in contact shall be kept cool.

A further object of my invention is to provide a device of the class mentioned adapted to be supported by a table and used in a manner similar to a chafing dish.

A further object of my invention is to provide a small portable electric cooker which may be readily knocked down for transportation and as readily set up for use.

A further object of my invention is to provide a device as mentioned in combination with a case particularly adapted to receive the same when in knocked down position to facilitate carrying the same.

Other objects will appear hereinafter.

With these objects in view my invention consists generally in a body portion comprising a double walled bottom and double walled sides, open at the top and provided with means for supporting a cooking utensil thereon, a non-conducting support within said body, a conductor thereon adapted to be heated to incandescence and means for connecting said conductor to a source of electric supply.

My invention further consists in a device as mentioned further characterized by a screen or baffle arranged beneath the non-conducting support above mentioned.

My invention further consists in a device as mentioned in combination with a plurality of detachable supporting legs.

My invention further consists in a device as mentioned comprising the body and detachable legs in combination with a casing adapted to receive said body portion, a closure for said casing provided with a chamber to receive the detachable legs and a closure for said chamber.

My invention further consists in various details of construction and arrangement of parts all as will be fully described hereinafter and particularly pointed out in the claims.

My invention will be more readily understood by reference to the accompanying drawings forming a part of this specification and in which—

Figure is a plan view of the device with the support for the cooking utensil removed, Fig. 2 is a vertical transverse section on substantially the line x—x of Fig. 1, Fig. 3 is a detail perspective view of one of the legs and the adjacent portion of the body illustrating the manner of connecting the legs to the body, Fig. 4 is a detail section illustrating a modified form of the connection to the source of electric supply, Fig. 5 is a detail horizontal section on substantially the line y—y of Fig. 2 illustrating a further modification in the manner of connecting the body portion with the source of electric supply, Fig. 6 is a perspective view of the case or container with a portion of the cover broken away to illustrate the construction, and Fig. 7 is a vertical transverse section of the same on substantially the line z—z of Fig. 6.

Referring now to the drawings A indicates the body of the device, B the detachable legs and C a detachable support for the cooking utensils. The body A comprises an outer cylindrical wall 1 formed preferably of sheet metal, an inner wall 2 spaced therefrom as hereinafter described, and a bottom 3. The cylindrical wall 1 is provided at its upper edge with an outwardly extending annular flange 4 and at its lower edge with an inwardly extending annular flange 5 upon which the bottom 3 and the lower edge of the wall 2 rest. The walls 1 and 2 are spaced apart by a corrugated cylindrical member 6 formed of sheet metal, preferably zinc and faced with a layer 7 of asbestos. The corrugations of the members 6 are substantially vertically arranged and the flange 6 is provided with a series of perforations 8 which admit air between the walls 1 and 2 and the corrugations of the members 6. The passage ways formed by the corrugations of the members 6 are open at the top so that a current of cold air may pass at all times between the walls 1 and 2 preventing the side walls from becoming over heated. The bottom 3 is formed of a pair of disks 9 separated by a corrugated member 10 faced with asbestos 11 in a manner similar to the member 6.

12 indicates an annular member adapted to receive the flange 4 to support the body A and equipped with a downwardly extending flange 13 to which the legs B are detachably secured. To this end the flange 13 is formed with sockets 14, preferably dove tailed and upwardly tapered into which similarly formed portions 15 on the upper end of the legs are adapted to fit. The legs B may be of any desired shape or configuration and at the upper end are formed with flanges 16 adapted to fit against the inner faces of the flanges 13 on the member 12 and upon which the portions 15 are formed. The lower ends of the legs are braced by a member $b$ consisting of three radial arms the ends of which fit in sockets $b'$ formed in the lower portions of the legs. The support C may be of any desired form to support a cooking utensil or bread for toasting, and the like, but in the drawings I have illustrated the usual form of spider as commonly used upon gas and vapor stoves.

Fixed to the bottom 3 and extending upwardly therefrom are a plurality of posts 17 to the upper ends of which is secured a mica disk 18. The disk 18 is of less diameter than the inner wall of the body portion leaving an annular space 19 between the edge thereof and said wall and is formed with a central aperture 20. A conductor 21 is arranged upon the nonconducting mica disk 18. This is preferably in the form of a single strip of flat conducting material arranged in the manner shown clearly in Fig. 1, that is woven through an outer and an inner annular series of perforations 22 and 23 respectively so that the larger portion of the conductor lies upon the upper face of the disk in radially disposed laps 24 connected at their outer and inner ends by the short portions 25 and 26 respectively the latter lying beneath the disk. By this arrangement only a small portion of the conductor lies beneath the surface of the disk 18 and what heat is radiated therefrom passes upwardly through the central aperture 20. A pair of blocks 27 and 28 of nonconducting material are secured to the inner and outer faces respectively of the body 1 and connected by insulating sleeves 29 in which the terminals 30 of the conductor 21 are arranged. This portion of the device will be more fully described hereinafter.

Arranged between the disk 18 and the bottom 3, and spaced from the same is a mica disk 31 which is of substantially the same diameter as the inner wall 2 of the body and supported upon a ring 32 in turn supported by a plurality of inwardly extending ears 33 preferably formed upon the members 34 secured to and depending from the ring 12. By this construction very little heat is radiated to the bottom 3 and on account of the construction of the latter this heat is not conducted to the outer face thereof.

A cable 35, forming a source of electric supply, is preferably connected to one of the detachable legs B as indicated at 36 in Figs. 1 and 2, but it is not essential to my invention that the cable should be permanently connected to the leg as it may be detachably connected by means of the slip plugs 37 illustrated in Fig. 4. If the cable is fixed to the leg as shown in Figs. 1 and 2 the ends of the conductors thereof are provided with plugs 38 which may be readily slipped into the sockets formed by the sleeves 29. If the plugs 37 are used for detachably connecting the cable 35 to the leg, a pair of conductors 39 are fixed to the inner face of the leg as indicated in Fig. 4 and these conductors are preferably provided with the plugs 38 as above described.

In Fig. 5 I have illustrated a modified form in which the terminals 30 extend through the sleeves 29 and are provided at their outer ends with binding screws 40 to which the ends of the conductors may be secured, the cable 35 passing through an aperture 41 in the leg.

42 indicates a case for the device when in knocked down position. This comprises a cylindrical member provided with a top or closure 43 having a depending annular flange 44, said flange and the upper portion of the body 42 being provided with a bayonet joint 45 for securing the closure in position. The top or closure 43 is provided on its inner face with a depending chamber 46 adapted to receive the detached legs B and equipped with spring clips 47, for holding the same in position therein. The chamber 46 is accessible through an opening 48 in the top of the closure 43 and said opening is closed by a sliding closure 49 mounted in guides 50 fixed to the upper face of the top 43.

51 indicate loops fixed to the casing 1 to which a carrying strap may be secured.

The body A fits snugly in the bottom of the case 42 beneath the chamber 46 and the whole forms a compact device for carrying.

When the device is set up for use and the current turned on, the conductor 21 is heated to incandescence. On account of the air at the space 19 being relatively cool to that at the center of the device a current of air passes downwardly through the space 19, between the mica disks 18 and 31 and upwardly through the aperture 20 thus concentrating the heat at the center. This, together with the construction of the outer walls and bottom of the body as hereinbefore described maintains the body relatively cool and easy to handle at all times without danger of being burned or without discomfort.

Having described my invention, I claim:

1. In an electric cook stove, a body comprising outer and inner side walls spaced apart and a double walled bottom, said body being open at the top, a support resting upon the upper edge of said side walls, a sheet of conconducting material supported within said body intermediate the top and bottom thereof, a conductor secured to said sheet and adapted to be heated to incandescence, and means for connecting said conductor to a source of electric supply, substantially as described.

2. In an electric cook stove, a body comprising a bottom and cylindrical side walls and open at the top, a sheet of nonconducting material supported within said body intermediate the top and bottom and spaced from said side walls, said sheet being provided with a single central aperture and a conductor secured to said sheet, the major portion resting on the upper face thereof and a minor portion on the under face, substantially as described.

3. In an electric cook stove, a body comprising a bottom and side walls, a sheet of nonconducting material supported within said body intermediate the top and bottom thereof, there being an air passage between the outer edge of said sheet and said side walls and said sheet being provided with a central aperture, and a conductor arranged upon said sheet, substantially as described.

4. In an electric cook stove, a body comprising double spaced side walls and a double walled bottom, posts fixed to said bottom and extending upwardly therefrom, a disk of nonconducting material supported by said posts, a conductor arranged upon said disk and a second disk of larger diameter than the first said disk and supported in said body intermediate the first said disk and said bottom, substantially as described.

5. In a device of the class described, a body comprising inner and outer walls, spaced apart, a spacing member for said walls formed of corrugated metal faced with asbestos and a conductor supported within said body adapted to be heated to incandescence, substantially as described.

6. In a device of the class described, inner and outer side walls, a corrugated member spacing said walls apart, the corrugations thereof being vertically disposed, there being perforations forming a communication with the lower ends of said corrugations, the upper ends of said corrugations being opened to the atmosphere and a bottom for said body, and a heat generating device within said body, substantially as described.

7. In a device of the class described, a body comprising a cylindrical outer wall provided with an outwardly extending annular flange at its upper edge and an inwardly extending annular flange at its lower edge, a cylindrical inner wall of less diameter resting upon the last mentioned flange, a bottom also resting upon said last mentioned flange, a corrugated member arranged between said inner and outer cylindrical walls spacing the same apart, the corrugations thereof extending substantially vertically and said inwardly extending annular flange being provided with perforations forming corrugations with the lower ends of said corrugations, and a heat generatinging device within said body, substantially as described.

8. In an electric heater, a body portion comprising a cylindrical side wall and a bottom, said body being open at the top, supports extending upwardly from said bottom, a disk of insulating material arranged upon said supports, the periphery of said disk being spaced from said side wall and said disk being provided with a central aperture, a conductor arranged upon said disk, inwardly extending ears arranged in a plane below said disk and above said bottom and a mica disk resting upon said ears and having its periphery substantially in engagement with said side wall, substantially as described.

9. In a device of the class described, a body comprising side walls and a bottom, a support within said body, a conductor arranged upon said support, a pair of terminals fixed in said side walls and insulated therefrom, said conductor being connected with said terminals and means for connecting a source of electric supply to said terminals, substantially as described.

10. In a device of the class described, a body portion and conductor arranged within said body portion, terminals for said conductor fixed in the side walls of said body, detachable legs for said body, means for connecting a source of electric supply to one of said legs and a detachable connection between said legs and said terminals, substantially as described.

11. In a device of the class described, a body portion and a heating chamber within said body portion, a conductor adjacent said heating chamber, terminals for said conductor fixed in the side walls of said body, detachable legs for said body, means for connecting a source of electric supply to one of said legs and a detachable connection between said legs and said terminals, substantially as described.

12. In an electric cooker, a body comprising side walls and a bottom, in combination with a pair of disks of non-conducting material supported within said body in superimposed relation, the uppermost of said disks being spaced from the side walls of said body, and the lowermost disk being extended to abut the surrounding walls of said body, the arrangement providing air spaces between the two disks, and between the lowermost disk and the receptacle bottom, and a conductor upon said upper disk, substantially as described.

In testimony whereof I have signed my name to this specification in the presence of two subscribing witnesses.

MARTIN L. KEAGY.

Witnesses:
 JOSEPH A. PINE,
 E. H. ECKERT.